United States Patent
Cho et al.

(10) Patent No.: US 7,816,052 B2
(45) Date of Patent: Oct. 19, 2010

(54) PORTION CONDUCTIVE ELECTROLYTE, METHOD OF PREPARING THE SAME, ELECTRODE FOR FUEL CELL, METHOD OF MANUFACTURING THE ELECTRODE, AND FUEL CELL INCLUDING THE SAME

(75) Inventors: Myung-dong Cho, Hwaseong-si (KR); Jung-ock Park, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1160 days.

(21) Appl. No.: 11/441,000

(22) Filed: May 26, 2006

(65) Prior Publication Data

US 2006/0269817 A1  Nov. 30, 2006

(30) Foreign Application Priority Data

May 27, 2005 (KR) ............... 10-2005-0045215
Jan. 11, 2006 (KR) ............... 10-2006-0003112

(51) Int. Cl.
*H01M 6/14* (2006.01)
(52) U.S. Cl. .................. 429/492; 429/491; 528/488
(58) Field of Classification Search ............ 429/491, 429/492; 528/488
See application file for complete search history.

(56) References Cited

U.S. PATENT DOCUMENTS 3,412,054 A * 11/1968 Milligan et al. ............ 524/591
5,912,093 A * 6/1999 Wen et al. .................. 429/188
2004/0131934 A1  7/2004 Sugnaux et al.
2004/0241541 A1 * 12/2004 Watanabe et al. ........... 429/163

FOREIGN PATENT DOCUMENTS

JP  2004-281223     10/2004
JP  2004281223 A *  10/2004
JP  2004533702 A *  11/2004

OTHER PUBLICATIONS

Japanese Office Action issued Jan. 5, 2010, in corresponding Japanese Patent Application No. 2006-148827.

* cited by examiner

*Primary Examiner*—Dah-Wei D. Yuan
*Assistant Examiner*—Zachary Best
(74) *Attorney, Agent, or Firm*—Lee & Morse, P.C.

(57) ABSTRACT

A proton conductive electrolyte including a polymerized polyurethane, polyethylene(metha)acrylic acid (PEAA), and a cross-linking agent mixture; a method of preparing the same; an electrode including a support and a catalyst layer, the catalyst layer including a supported catalyst and a polymerized mixture of a polyurethane based compound and a polyethylene(metha)acrylic acid; a method of preparing the electrode; and a fuel cell including the proton conductive electrolyte and/or the electrode. The proton conductive electrolyte can be prepared at lower costs than conventionally used polybenzimidazole and NAFION and can be easily formed into a membrane with a controlled thickness by casting. The polymer electrolyte membrane has high mechanical strength, flexibility, and excellent ionic conductivity. The electrode remains stable under high temperature operation, a strong binding force is maintained between the support and the catalyst layer, and the electrode has excellent ionic conductivity. The fuel cell produced using the proton conductive electrolyte and/or the electrode can operate at 100° C. or higher under non-humidified conditions and exhibits an improved performance.

44 Claims, 4 Drawing Sheets

PORTION CONDUCTIVE ELECTROLYTE, METHOD OF PREPARING THE SAME, ELECTRODE FOR FUEL CELL, METHOD OF MANUFACTURING THE ELECTRODE, AND FUEL CELL INCLUDING THE SAME

CROSS-REFERENCE TO RELATED APPLICATIONS

This application claims the benefit of Korean Patent Application Nos. 2005-45215, filed on May 27, 2005, and 1006-3112, filed on Jan. 11, 2006, in the Korean Intellectual Property Office, the disclosures of which are incorporated herein in their entirety by reference.

BACKGROUND OF THE INVENTION

1. Field of the Invention

Aspects of the present invention relate to a proton conductive electrolyte, a method of preparing the same, an electrode for a fuel cell, a method of manufacturing the same, and a fuel cell using the proton conductive electrolyte and/or the electrode, and more particularly, to a proton conductive electrolyte suitable for high temperature fuel cells, which remains stable at a high temperature, an electrode that remains stable at a high temperature, and a catalyst and carbon paper used as a support of the electrode are bound to each other with a greatly improved binding force, methods of preparing the proton conductive electrolyte and the electrode, and a fuel cell using the proton conductive electrolyte and/or the electrode.

2. Description of the Related Art

Conventionally, it is known that an ionic conductor is a substance where ions move when a voltage is applied. Ionic conductors are used as electrochemical devices, such as fuel cells, electrochemical sensors, or the like.

For example, in terms of energy generating efficiency, system efficiency, long-term durability of forming members, fuel cells require a proton conductor that exhibits reliable, stable proton conductivity at an operating temperature of 100 to 300° C. under non-humidified conditions or low-humidified conditions with a relative humidity of 50% or less for a long time.

Solid polymer-type fuel cells that comply with this requirement have been developed. For example, a solid polymer-type fuel cell that includes an electrolyte membrane formed of a perfluorocarbonsulfonic has been developed. However, the solid polymer-type fuel cell that includes an electrolyte membrane formed of a perfluorocarbonsulfonic acid cannot sufficiently operate at an operating temperature of 100 to 300° C. in a relative humidity of 50% or less.

Furthermore, there is a fuel cell that includes an electrolyte membrane using a substance that triggers a proton conductivity, a fuel cell that uses a silica diffusion membrane, a fuel cell that uses an inorganic-organic composite membrane, a fuel cell that uses a phosphoric acid-doped graft membrane, and a fuel cell that uses an ionic liquid composite membrane.

In addition, a solid polymer electrolyte membrane formed of polybenzimidazole which is doped with a strong acid, such as a phosphoric acid or the like, is disclosed (in U.S. Pat. No. 5,525,436.)

However, such solid polymer electrolyte membranes described above cannot stably operate for a long time at high temperatures. In particular, long term stability is insufficient at a high operation temperature of 100 to 300° C. under non-humidified conditions or in a relative humidity of 50% or less.

As an example of such a proton conductor, a fuel cell using a perfluorocarbonsulfonic acid or polybenzimidazole (PBI)/polyvinylidenefluoride (PVDF) as an electrode binder is disclosed.

A fuel cell using a perfluorocarbonsulfonic acid as an electrode binder has large mechanical strength, excellent chemical stability, and high ionic conductivity. However, when the fuel cell operates at 80° C. or higher, it loses water and thus cannot be used any more. As a result, when perfluorocarbonsulfonic acid is used as a proton conductor, advantages that can be obtained when a fuel cell operates at high temperatures cannot be obtained. That is, at an operation temperature of 100-300° C. and in a relative humidity of 50% or less, an adequate performance cannot be obtained.

On the other hand, when a fuel cell uses polybenzimidazole (PBI)/polyvinylidenefluoride (PVDF) as an electrode binder, oxygen transmittance thereof is low.

In addition, the fuel cells described above can experience a flooding phenomenon when operating, due to an excessive impregnation with a phosphoric acid, swelling to a substantial degree when operating at high temperatures and thus such fuel cells can undergo partial failure.

SUMMARY OF THE INVENTION

Aspects of the present invention provide: a proton conductive electrolyte that retains high ionic conductivity and when formed in a membrane does not deform at high temperatures, such that it is suitable for forming a high temperature polymer electrolyte membrane; a method of preparing the proton conductive electrolyte; and a fuel cell having improved performance using the proton conductive electrolyte.

Aspects of the present invention also provide: an electrode that is used in a fuel cell and is stable at high temperature and highly ionically conductive, and a catalyst layer and a support of the electrode are bound to each other with a large binding force; a method of manufacturing the same; and a fuel cell having enhanced performance including the electrode.

According to an aspect of the present invention, there is provided a proton conductive electrolyte, including a polymerization product obtained by polymerizing a mixture of a polyurethane based compound represented by formula 1 and a polyethylene(metha)acrylic acid represented by formula 2:

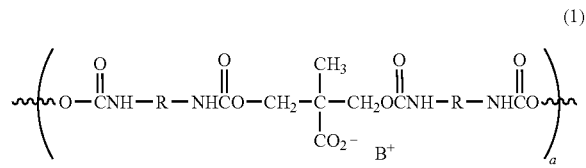

where R is a substituted or unsubstituted C1-C20 alkylene group, a substituted or unsubstituted C4-C20 cycloalkylene group, a substituted or unsubstituted C6-C20 arylene group, or substituted or unsubstituted C2-C20 heteroarylene group, a is a number between 10 and 500, and $B^+$ is $H^+$, $NH_4^+$, or an alkali metal ion; and

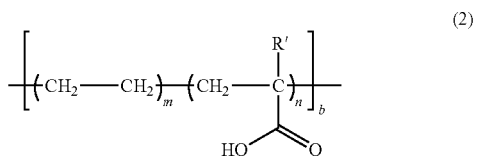

(2)

where R' is hydrogen or a methyl group, m ranges from 70 to 90 mol %, n ranges from 10 to 30 mol %, and b is a number between 50 and 1000.

While not required in all aspects, the mixture of the polyurethane based compound represented by formula 1 and the polyethylene(metha)acrylic acid represented by formula 2 further includes a cross linking agent. While not required in all aspects, the cross linking agent is in the range of 5-30 parts by weight based on 100 parts by weight of the polyurethane based compound represented by formula 1. The cross linking agent may be an aziridine based compound, an oxazoline based compound, or a mixture thereof. The aziridine based compound may be one of a modified diisocyanate and a diepoxide compound.

While not required in all aspects, the amount of the polyethylene(metha)acrylic acid represented by formula 2 in the mixture of polyurethane based compound represented by formula 1 and the polyethylene(metha)acrylic acid represented by formula 2 is in the range of 30 to 65 parts by weight based on 100 parts by weight of the polyurethane based compound represented by formula 1. The mixture may further include an acid and, although not required in all aspects, the acid may be a phosphoric acid, and the amount of the phosphoric acid is in the range of 150-500 parts by weight based on 100 parts by weight of the polyurethane based compound represented by formula 1.

According to another aspect of the present invention, there is provided a method of preparing the proton conductive electrolyte, the method including: adding a base to a polyethylene(metha)acrylic acid (PEAA) represented by formula 2 to obtain a corresponding salt; adding the polyurethane based compound represented by formula 1 and a solvent to the corresponding salt to prepare a mixture; and polymerizing the mixture:

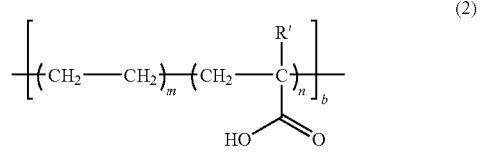

(2)

where R' is hydrogen or a methyl group, m ranges from 70 to 90 mol %, n ranges from 10 to 30 mol %, and b is a number between 50 and 1000.

While not required in all aspects, to prepare the proton conductive electrolyte the mixture of the polyurethane based compound of formula 1 and the polyethylene(metha)acrylic acid of formula 2 may further include a cross linking agent. The cross linking agent may be an aziridine based compound, an oxazoline based compound, or a mixture thereof. The aziridine based compound may be one of a modified diisocyanate and a diepoxide compound. The amount of the cross linking agent may be in the range of 5 to 30 parts by weight based on 100 parts by weight of the polyurethane based compound represented by formula 1.

While not required in all aspects, preparing the proton conductive electrolyte includes the impregnating the polymerization product with an acid. The acid may be a phosphoric acid, and the amount of the phosphoric acid may be in the range of 150-500 parts by weight based on 100 parts by weight of the polyurethane based compound represented by formula 1. While not required in all aspects, the polymerization is performed at 80 to 120° C. The base may be ammonia water, triethylamine (TEA), tributylamine, sodium hydroxide (NaOH), potassium hydroxide (KOH), and lithium hydroxide (LiOH). Although not required in all aspects, the polymerizing is performed by casting the mixture and drying the cast result at 80 to 120° C.

According to another aspect of the present invention, there is provided a fuel cell including the proton conductive electrolyte described above.

According to another aspect of the present invention, there is provided an electrode that is used in a fuel cell, including an electrode support and a catalyst layer formed on the electrode support, the catalyst layer further includes a supported catalyst and a polymerization product obtained by polymerizing a mixture of a polyurethane based compound represented by formula 1 and a polyethylene(metha)acrylic acid represented by formula 2:

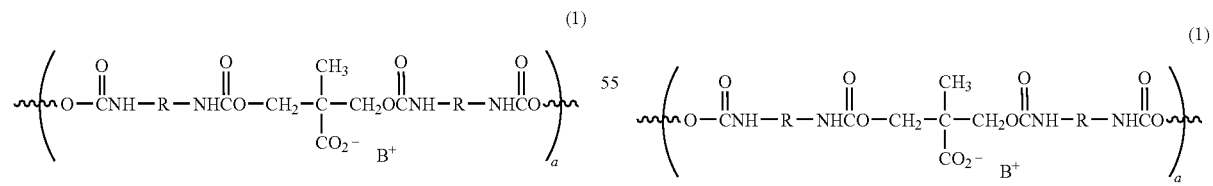

(1)

where R is a substituted or unsubstituted C1-C20 alkylene group, a substituted or unsubstituted C4-C20 cycloalkylene group, a substituted or unsubstituted C6-C20 arylene group, or substituted or unsubstituted C2-C20 heteroarylene group, a is a number between 10 and 500, and $B^+$ is $H^+$, $NH_4^+$, or an alkali metal ion; and

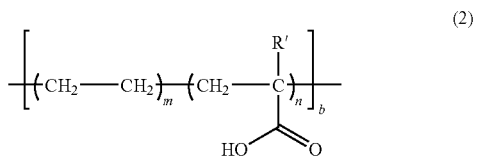

(2)

where R' is hydrogen or a methyl group, m ranges from 70 to 90 mol %, n ranges from 10 to 30 mol %, and b is a number between 50 and 1000.

While not required in all aspects, the mixture of the polyurethane based compound represented by formula 1 and the polyethylene(metha)acrylic acid represented by formula 2 may further include a cross linking agent. The cross linking agent may be an aziridine based compound, an oxazoline based compound, or a mixture thereof. The amount of cross linking agent may be in the range of 5-30 parts by weight based on 100 parts by weight of the polyurethane based compound represented by formula 1.

While not required in all aspects, the cross linking agent is an aziridine based compound, which is selected from a modified diisocyanate and a diepoxide compound.

While not required in all aspects, the electrode may further include an oxazoline based compound during a polymerization process. The amount of the oxazoline based compound may be in the range of 5-30 parts by weight based on 100 parts by weight of the polyurethane based compound represented by formula 1.

While not required in all aspects, the amount of the polymerization product may be in the range of 3-25 parts by weight based on 100 parts by weight of the supported catalyst.

While not required in all aspects, the electrode may further include an acid. The acid may be a phosphoric acid, and the amount of the phosphoric acid may be in the range of 10-200 parts by weight based on 100 parts by weight of the supported catalyst.

According to another aspect of the present invention, there is provided a method of manufacturing an electrode that is used in a fuel cell, the method including: adding a base to a polyethylene(metha)acrylic acid (PEAA) represented by formula 2 to obtain a corresponding salt; adding a polyurethane based compound represented by formula 1 and a solvent to the corresponding salt to prepare a mixture; and polymerizing the mixture to form the electrode described above:

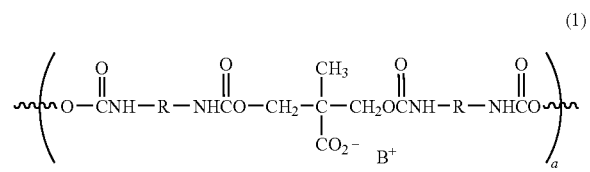

(1)

where R is a substituted or unsubstituted C1-C20 alkylene group, a substituted or unsubstituted C4-C20 cycloalkylene group, a substituted or unsubstituted C6-C20 arylene group, or substituted or unsubstituted C2-C20 heteroarylene group, a is a number between 10 and 500, and $B^+$ is $H^+$, $NH_4^+$, or an alkali metal ion; and

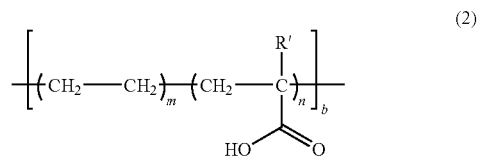

(2)

where R' is hydrogen or a methyl group, m ranges from 70 to 90 mol %, n ranges from 10 to 30 mol %, and b is a number between 50 and 1000.

While not required in all aspects, to manufacture the electrode used in a fuel cell the mixture of the polyurethane based compound of formula 1 and the polyethylene(metha)acrylic acid of formula 2 may further include a cross linking agent. The cross linking agent may be an aziridine based compound, an oxazoline based compound, or a mixture thereof. The aziridine based compound may be one of a modified diisocyanate and a diepoxide compound. The amount of the cross linking agent may be in the range of 5 to 30 parts by weight based on 100 parts by weight of the polyurethane based compound represented by formula 1.

While not required in all aspects, manufacturing the electrode used in a fuel cell includes the impregnating the polymerization product with an acid. The acid may be a phosphoric acid, and the amount of the phosphoric acid may be in the range of 150-500 parts by weight based on 100 parts by weight of the polyurethane based compound represented by formula 1. While not required in all aspects, the polymerization is performed at 80 to 120° C. The base may be ammonia water, triethylamine (TEA), tributylamine, sodium hydroxide (NaOH), potassium hydroxide (KOH), and lithium hydroxide (LiOH). Although not required in all aspects, the polymerizing is performed by casting the mixture and drying the cast result at 80 to 120° C.

According to another aspect of the present invention, there is provided a fuel cell including the electrode described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
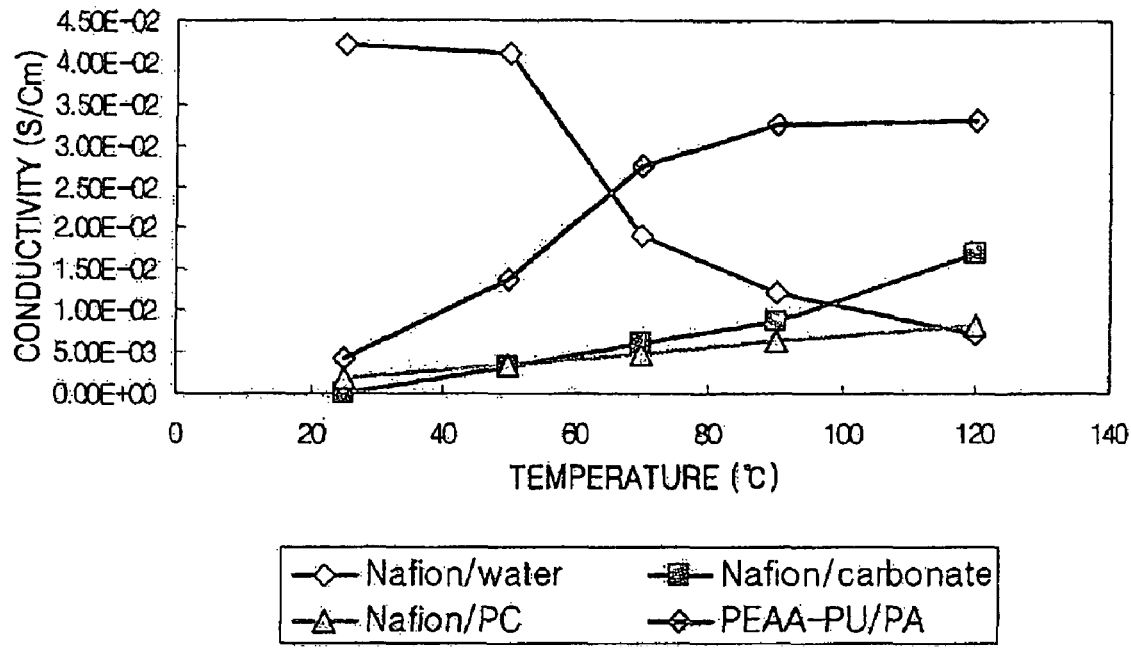
FIG. 1 is a graph of conductivity with respect to temperature of a proton conductive electrolyte according to Example 1.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A proton conductive electrolyte according to an embodiment of the present invention is prepared by polymerizing (or cross-linking) a mixture of a water-born polyurethane based compound represented by formula 1 and a polyethylene (metha)acrylic acid (PEAA) represented by formula 2, and impregnating the polymerization result with an acid. During the polymerizing process, a cross-linking agent may further be added to the mixture. The proton conductive electrolyte may have different physical and thermal properties according to a degree of crosslinking. The proton conductive electrolyte prepared above has a high physical strength that stems from the PEAA, flexibility that stems from the polyurethane, and excellent ionic conductivity.

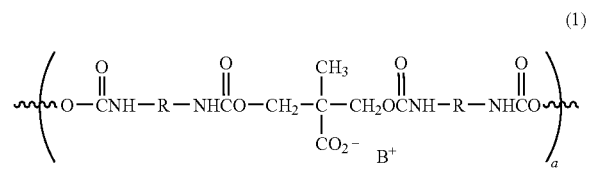
(1)

where R is a substituted or unsubstituted C1-C20 alkylene group, a substituted or unsubstituted C4-C20 cycloalkylene group, a substituted or unsubstituted C6-C20 arylene group, or substituted or unsubstituted C2-C20 heteroarylene group;
a is a number between 10 and 500; and
$B^+$ is $H^+$, $NH_4^+$, or an alkali metal ion (for example, $Li^+$, $Na^+$, or $K^+$).

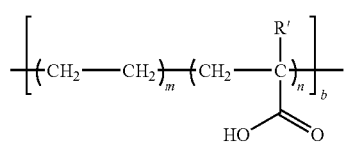
(2)

where R' is hydrogen or a methyl group, m ranges from 70 to 90 mol %, n ranges from 10 to 30 mol %, and b is a number between 50 and 1000.

An electrode that is used in a fuel cell according to an embodiment of the present invention is formed of an electrode support and a catalyst layer. In particular, the catalyst layer includes a supported catalyst and a binder prepared by polymerizing (cross linking) a mixture of a water borne polyurethane based compound of formula 1 and a polyethylene (metha)acrylic acid of formula 2 and then impregnating the resultant polymerization product with an acid.

During the polymerizing process, a cross linking agent can be further added to the mixture of the polyurethane based compound of formula 1 and the polyethylene(metha)acrylic acid of formula 2. The electrode may exhibit various physical and thermal properties according to a degree of cross linkage. The electrode exhibits a high mechanical strength resulting from use of the polyethylene(metha)acrylic acid, and flexibility resulting from use of the polyurethane. In addition, the catalyst layer and electrode support are bound to each other with an enhanced binding force even with a small amount of the binder. Furthermore, the electrode exhibits excellent electrical resistance with respect to a conventional electrode. As described above, the relative amount of the binder required can be very small. Therefore, the relative amount of the catalyst can be increased and the binder as a crosslinked polymer exhibits excellent chemical, electrical, and mechanical properties at high temperature.

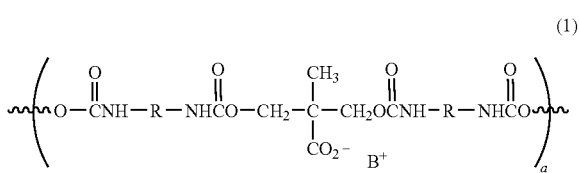
(1)

where R is a substituted or unsubstituted C1-C20 alkylene group, a substituted or unsubstituted C4-C20 cycloalkylene group, a substituted or unsubstituted C6-C20 arylene group, or substituted or unsubstituted C2-C20 heteroarylene group;
a is a number between 10 and 500; and
$B^+$ is $H^+$, $NH_4^+$, or an alkali metal ion (for example, $Li^+$, $Na^+$, or $K^+$).

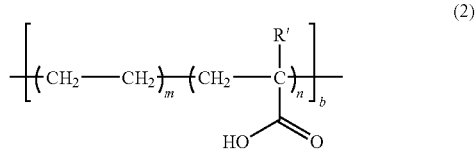
(2)

where R' is hydrogen or a methyl group, m ranges from 70 to 90 mol %, n ranges from 10 to 30 mol %, and b is a number between 50 and 1000.

The water-borne polyurethane of formula 1 has excellent elastic and recovery forces, resistance to chemical reagents, good physical properties, a large adhering force, and a large binding force.

The weight average molecular weight (Mw) of the water-born polyurethane represented by formula 1 may be in the range of 5,000 to 500,000, for example, about 10,000. The Mw of the PEAA represented by formula 2 may be in the range of 10,000 to 500,000, for example, about 100,000.

In formula 1, the unsubstituted C1-C10 alkylene group may be methylene, ethylene, propylene, isobutylene, sec-butylene, pentylene, iso-amilene, hexylene, or the like. At least one hydrogen atom of the unsubstituted C1-C10 alkylene group may be a halogen atom, a hydroxyl group, a nitro group, a cyano group, an amino group, an amidino group, hydrazine, hydrazone, a carboxyl group or a salt thereof, a sulfonic acid or a salt thereof, a phosphoric acid or a salt thereof, a C1-C6 alkyl group, a C2-C6 alkenyl group, a C2-C6 alkylnyl group, a C1-C6 heteroalkyl group, a C2-C6 aryl group, a C6-C20 arylalkyl group, a C6-C20 heteroaryl group, or a C6-C20 heteroarylalkyl group.

The arylene group may be used in isolation or in combination. The arylene group is a bivalent carbocycle aromatic system including at least one ring. These rings may be pendent or fused together. The term 'arylene' denotes the presence of aromatic radicals, such as phenylene, naphthalene, or tetrahydronaphthalene. The arylene group may have a substituent, such as haloalkylene, nitro, cyano, alkoxy, or a lower alkylamino. In addition, at least one hydrogen atom included in the arylene group can be substituted with a substituent as described above with the alkyl group.

The heteroarylene group may contain one, two or three atoms selected from N, O, P and S and the residual ring atom is a bivalent monocyclic or non-cyclic aromatic organic compound. In addition, at least one hydrogen atom included in the heteroarylene group can be substituted with a substituent as described above with the alkyl group.

The cycloalkylene group may be a hexylene group or similar groups. At least one hydrogen atom included in the cycloalkylene group can be substituted with a substituent as described above with the alkyl group.

The polyurethane based compound represented by formula 1 may be a PRIMACOR 5980 produced by Dow Chemical Inc., or may be prepared using a dimethylol butanoic acid, a dimethylol propionic acid, a poly(tetramethylene ether glycol) (PTMEG), poly(propylene glycol) (PPG), polycaprolactone diol (PCL), or the like.

The PEAA may be a polyethylene acrylic acid represented by formula 2 in which R' is hydrogen.

The cross-linking agent may be an aziridine based compound, an oxazoline based compound, or a mixture thereof. In particular, the aziridine based compound can be trimethylolpropane tri-(2-methyl-1-aziridine propionate), a modified diisocyanate such as isophorone diisocyanate, or diepoxide compound.

As described above, when a crosslinking additive is added, a large mechanical strength and high stability at high temperature can be obtained.

The oxazoline based compound may be EPOCROS (manufactured by Nippon Shokubai Inc.)

A catalyst used to form a catalyst layer according to an embodiment of the present invention can be a supported catalyst formed of a catalyst support and a metallic catalyst particle supported by the catalyst support.

In the catalyst layer, the amount of a polymerization product of the polyurethane based compound of formula 1 and the polyethylene(metha)acrylic acid of formula 2, or the amount of a polymerization product of the polyurethane based compound of formula 1, the polyethylene(metha)acrylic acid of formula 2, and a crosslinking agent may be in the range of 3-25 parts by weight based on 100 parts by weight of the catalyst and the catalyst support, that is, 100 parts by weight of the supported catalyst.

When respective polymerization products are less than 3 parts by weight, the binding property is insufficient. On the other hand, when respective polymerization products are greater than 20 parts by weight, electron conductivity decreases.

A method of preparing the proton conductive electrolyte will now be described in detail.

A base is added to a PEAA represented by formula 2 to produce a corresponding salt that is soluble in water. In this case, the base may be, but is not limited to, ammonia water, triethylamine (TEA), tributylamine, sodium hydroxide (NaOH), potassium hydroxide (KOH), lithium hydroxide (LiOH), or the like. The amount of the base may be in the range of 30 to 100 parts by weight based on 100 parts by weight of the PEM. Generally, when the amount of the base is less than 30 parts by weight, the PEM does not completely dissolve.

A polyurethane based compound represented by formula 1 and a solvent are added to the salt of the PEAA and then mixed. When needed, a cross linking agent can be further added in this process.

The amount of the PEAA may be in the range of 30 to 65 parts by weight based on 100 parts by weight of the polyurethane based compound represented by formula 1. Generally, when the amount of the PEAA is less than 30 parts by weight, the physical and chemical strength decreases and the electrolyte is dissolved in a phosphoric acid at high temperature. When the amount of the PEAA is greater than 65 parts by weight, generally an insufficient amount of phosphoric acid impregnates the proton conductive electrolyte for adequate conductivity.

The amount of the cross-linking agent may be in the range of 5 to 30 parts by weight based on 100 parts by weight of the polyurethane based compound represented by formula 1. Generally, when the amount of the aziridine based compound is less than 5 parts by weight, mechanical strength decreases. On the other hand, when the amount of the aziridine based compound is greater than 30 parts by weight, ionic conductivity generally decreases.

The cross linking agent may be an aziridine based compound, an oxazoline based compound, or a mixture thereof. Examples of these compounds have already been described when the catalyst layer was described above.

The solvent may be water (deionized water). The amount of the water is adjusted such that the amount of a solid content with respect to the water is in the range of 18 to 30% by weight.

The mixture is cast and dried at 80° C. to 120° C. to perform a polymerizing (cross-linking) reaction. Generally, when the polymerizing temperature is less than 80° C., the polymerizing reaction is reduced. When the polymerizing temperature is greater than 120° C., the polymerizing reaction occurs very quickly such that cross linking generally occurs excessively. The polymerizing time may be dependent on the polymerizing temperature used. For example, when the polymerizing reaction is performed at 120° C., a suitable polymerizing time may be 2 hours, and when the polymerizing reaction is performed at lower than 100° C., a suitable polymerizing time may be 4 hours. During polymerization, radiation, such as electron, ultraviolet, infrared, alpha, beta, gamma, microwave, laser or a combination thereof may be used to improve polymerization. For example, polymerization time, amount of crosslinking agent, and/or the polymerization temperature may be reduced.

After the polymerizing reaction is completed, the result of the polymerization is impregnated with an acid to produce a proton conductive electrolyte.

The acid may be, but is not limited to, a phosphoric acid, sulfuric acid, or the like. Generally, as the amount of the acid increases, ionic conductivity increases. In Example 1, the amount of the phosphoric acid used was in the range of 150 to 500 parts by weight based on 100 parts by weight of the polyurethane based compound represented by formula 1.

The concentration of the phosphoric acid is not limited, but an aqueous solution of a phosphoric acid of 80 to 100 wt %, and preferably, 85 wt %, is used.

The impregnation may be performed at high temperature (for example, 80° C.) for 1-4 hours, preferably, 2 hours.

The proton conductive electrolyte prepared in the above processes may contain a polymerization product of the polyurethane based compound of formula 1 and the polyethylene (metha)acrylic acid of formula 2, a polymerization product of the polyurethane based compound of formula 1, the polyethylene(metha)acrylic acid of formula 2, and a crosslinking agent, or a combination thereof.

The proton conductive electrolyte may have a thickness of 40 to 80 µm.

A method of manufacturing the electrode described above will now be described in detail.

A base is added to a polyethylene(metha)acrylic acid to form a corresponding salt that is soluble in water. The base is not limited and can be ammonia water, triethylamine (TEA), tributylamine, sodium hydroxide (NaOH), potassium hydroxide (KOH), and lithium hydroxide (LiOH). The amount of the base may be in the range of 30-100 parts by weight based on 100 parts by weight of the polyethylene (metha)acrylic acid. When the amount of the base is less than 30 parts by weight, the polyethylene (metha)acrylic acid does not dissolve completely.

A polyurethane based compound of formula 1, a supported catalyst, and a solvent was added to the salt of the polyethylene (metha)acrylic acid and the resultant mixture is mixed. In this process, when needed, a cross linking agent may further be added thereto.

The amount of the polyethylene (metha)acrylic acid may be in the range of 30-65 parts by weight based on 100 parts by weight of the polyurethane based compound of formula 1. Generally, when the amount of the polyethylene (metha) acrylic acid is less than 30 parts by weight, the mechanical and chemical strength is insufficient and the binder may be dissolved in a phosphoric acid at high temperature. On the other hand, when the amount of the polyethylene (metha) acrylic acid is greater than 65 parts by weight, an insufficient amount of the phosphoric acid may impregnate the polymerized product and the conductivity of the electrode decreases.

The amount of the cross linking agent may be in the range of 5-30 parts by weight based on 100 parts by weight of the polyurethane based compound of formula 1. Generally, when the amount of the cross linking agent is less than 5 parts by weight, the mechanical properties decrease. On the other hand, when the amount of the cross linking agent is greater than 30 parts by weight, ionic conductivity generally decreases.

A metallic catalyst particle of the supported catalyst is not limited, and can be platinum (Pt), ruthenium (Ru), tin (Sn), palladium (Pd), titanium (Ti), vanadium (V), chromium (Cr), manganese (Mn), iron (Fe), cobalt (Co), nickel (Ni), copper (Cu), zinc (Zn), aluminum (Al), molybdenum (Mo), selenium (Se), tungsten (W), iridium (Ir), osmium (Os), rhodium (Rh), niobium (Nb), tantalum (Ta), lead (Pb), indium (In), antimony (Sb), an alloy thereof, or a mixture thereof. For example, the metallic catalyst particle can be nano particles of Pt and an alloy of Pt, such as an alloy of Pt and Ru, an alloy of Pt, Ni, and Ru, etc.

The supported catalyst according to an embodiment of the present invention can be Pt/C, or the like.

The mixture prepared as described above is coated on an electrode support and heat treated to perform a polymerization (crosslinking) reaction. The heat treatment temperature may be in the range of 100-300° C. In other embodiments, a drying process may be added before the heat treatment process.

Generally, when the polymerization temperature is less than 100° C., polymerization reactivity decreases. On the other hand, when the polymerization temperature is greater than 300° C., excessive cross linkage generally occurs due to a quick reaction. The polymerization reaction time may vary according to the polymerization temperature, for example, 1-3 hours. During polymerization, radiation, such as electron, ultraviolet, infrared, alpha, beta, gamma, microwave, laser or a combination thereof may be used to improve polymerization. For example, the polymerization time, amount of crosslinking agent, and/or polymerization temperature may be reduced.

The electrode support may be carbon paper, carbon cloth, a microporous layer-coated carbon paper/cloth, or the like.

When the polymerization reaction is completed, the polymerization product is impregnated with an acid, thereby producing an electrode that is used in a fuel cell.

The acid may be, but is not limited to, a phosphoric acid or the like. A greater amount of the acid is advantageous in terms of ionic conductivity. For example, the amount of the acid may be in the range of 150-500 parts by weight based on 100 parts by weight of the polyurethane compound of formula 1.

The concentration of the phosphoric acid is not limited, and for example, may be in the range of 80-100 wt %, for example, 85 wt %.

The impregnating process may be performed at high temperature, such as 80° C. for 1-4 hours, for example, 2 hours.

The electrode prepared as described above includes an electrode support and a catalyst layer which is formed on the electrode support and formed of a polymerization product of a supported catalyst, a polyurethane compound of formula 1, and a polyethylene(metha)acylic acid of formula 2, or of a polymerization product of a supported catalyst, a polyurethane compound of formula 1, a polyethylene(metha)acylic acid of formula 2, and a cross linking agent, such as an aziridine based compound, an oxazoline based compound, or a mixture thereof.

A fuel cell according to an embodiment of the present invention uses the proton conductive electrolyte prepared as described above as an electrolyte membrane.

Figure 4:
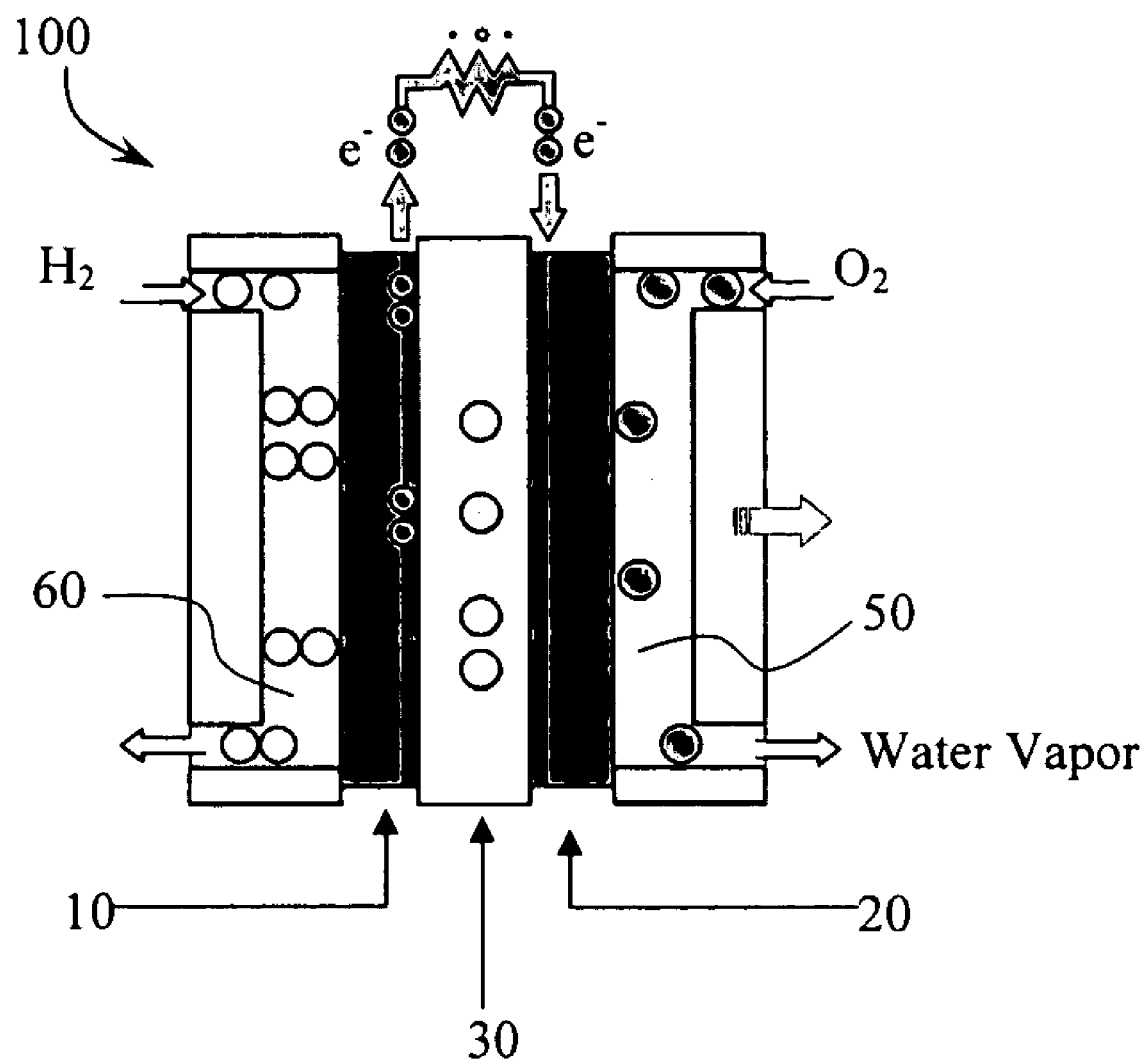
FIG. 4 is a schematic of a fuel cell according to an embodiment of the invention.

Referring to FIG. 4, a fuel cell 100 according to an embodiment of the present invention includes a fuel electrode 10 and an oxygen electrode 20. The electrolyte membrane is interposed between the oxygen electrode 20 and the fuel electrode 10. An oxidant discharge plate including an oxidant channel 50 is located at the oxygen electrode 20. A fuel discharge plate including a fuel channel 60 is located at the fuel electrode 10. A polymer fuel cell can be manufactured using such a structure as a unit cell.

Figure 5:
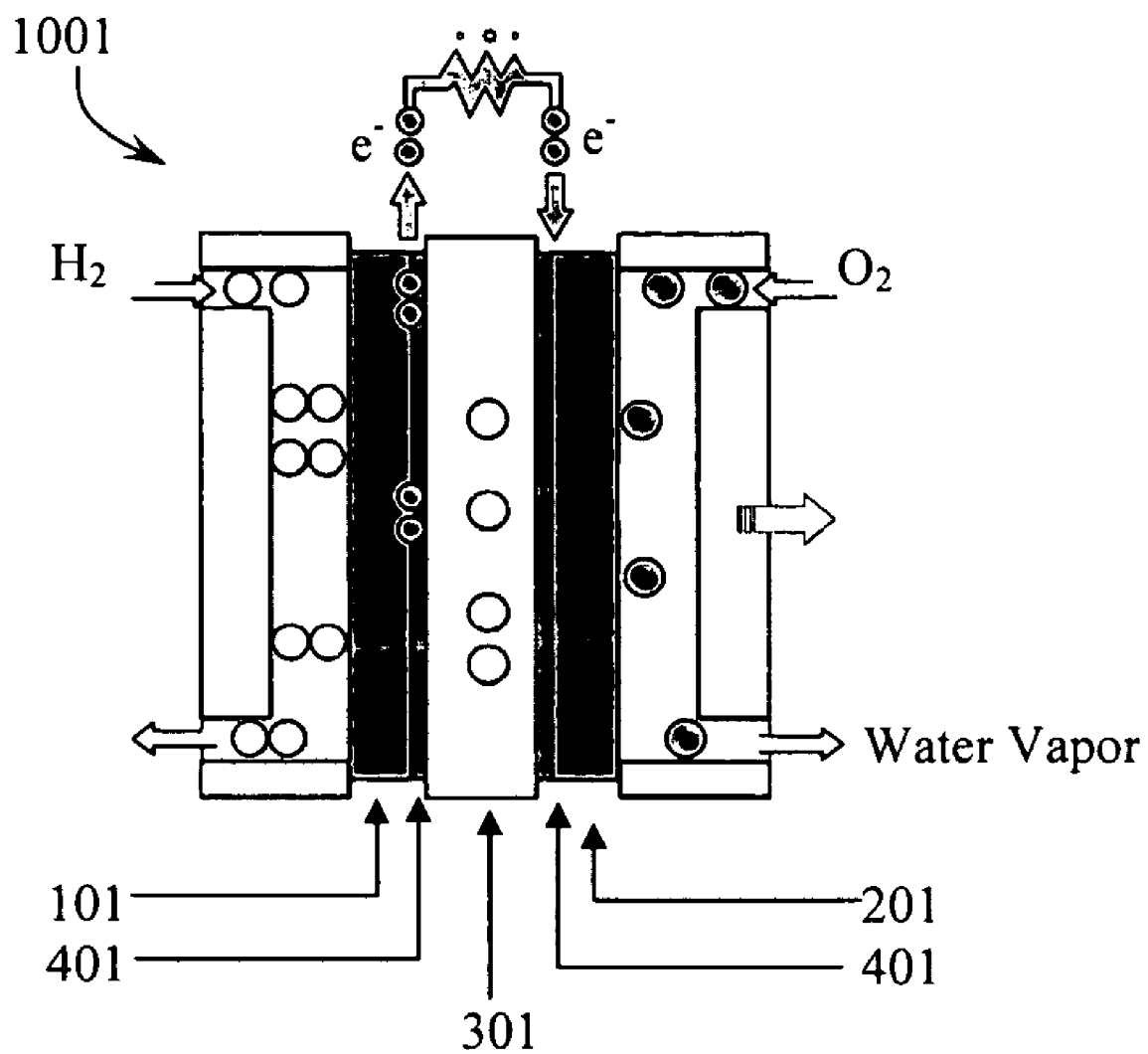
FIG. 5 is a schematic of a fuel cell according to another embodiment of the present invention.

A fuel cell according to another embodiment of the present invention includes the electrode prepared as described above as at least one of a cathode 201 and an anode 101, as shown in FIG. 5. Each electrode is formed of an electrode support 101/201 and a catalyst layer 401. An electrolyte membrane 301 may not be limited, and may be formed of at least one compound selected from polybenzimidazole (PBI), polyurethane, and modified polytetrafluoroethylene (PTFE). The electrolyte membrane 301 may be interposed between the cathode 201 and the anode 101, thereby manufacturing a fuel cell 1001.

Such polymer type fuel cells are durable and may stably operate for a long time at 100 to 300° C. under non-humidified conditions or in a relative humidity of 50% or less. For example, these fuel cells are suitable as a power source for cars or domestic energy generating systems.

The present invention will be described in further detail with reference to the following examples. These examples are for illustrative purposes only and are not intended to limit the scope of the present invention.

EXAMPLE 1

When the Weight Ratio of PEAA to Polyurethane to Cross Linking Agent (Aziridine Based Compound) is 0.5:0.5:0.2

100% ammonia water was added to 40 parts by weight of PEAA (product name: PRIMACOR 5980 produced by Dow Chemical Inc.). The resultant mixture was blended with 30 parts by weight of a water-born polyurethane, 10 parts by weight of an aziridine based compound, and 20 parts by weight of EPOCROS (obtained form Nippon Shokubai Inc.), an oxazoline based compound. A deionized water, as a solvent, was added to the result of the blending and then mixed.

The mixture was cast and dried at 120° C. for four hours to form an about 100 µm-thick membrane. The membrane was impregnated with 85% phosphoric acid at room temperature for 2 hours to produce a proton conductive electrolyte.

EXAMPLE 2

A proton conductive electrolyte was prepared in the same manner as in Example 1 except that the weight ratio of PEAA to polyurethane to the aziridine based compound was 0.67: 0.47:0.35.

EXAMPLE 3

A proton conductive electrolyte was prepared in the same manner as in Example 1 except that the weight ratio of PEAA to polyurethane to the aziridine based compound was 0.58: 0.63:0.27.

The varying conductivity of the proton conductive electrolyte membrane prepared according to Example 1 with respect to temperature is illustrated in FIG. 1. As a reference for the proton conductive electrolyte membrane prepared according to Example 1, FIG. 1 also shows curves of a proton conductive electrolyte membrane (-◇-) that was prepared by impregnating NAFION with water, a proton conductive electrolyte membrane (-□-) that was prepared by impregnating NAFION with ethylene carbonate, and a proton conductive electrolyte membrane (-Δ-) that was prepared by impregnating NAFION with propylene carbonate (PC.)

Referring to FIG. 1, the NAFION—$H_2O$ system and the NAFION-organic solvent system (in which an organic solvent having a high boiling point was used), which are conventionally used in a proton electrolyte membrane fuel cell (PEMFC), were compared with the proton conductive electrolyte membrane prepared according to Example 1. As a result, excellent conductivity of the proton conductive electrolyte membrane prepared according to Example 1 at high temperature was identified.

EXAMPLE 4

The solid polymer electrolyte prepared according to Example 1 was interposed between fuel cell electrodes (produced from Electrochemist Inc.) that are commercially available, thus producing a membrane-electrode assembly. The membrane-electrode assembly operated with the supply of hydrogen/air at 110° C. to about 150° C. under a non-humidified condition. Each electrode surface area was 9 $cm^2$ (3 cm×3 cm), and 100 ccm/min of hydrogen and 300 ccm/min of air were supplied.

EXAMPLES 5 AND 6

The same experiments were performed in the same manner as in Example 4 except that the operating temperatures were 130° C. in Example 5 and 150° C. in Example 6, respectively.

Figure 2:
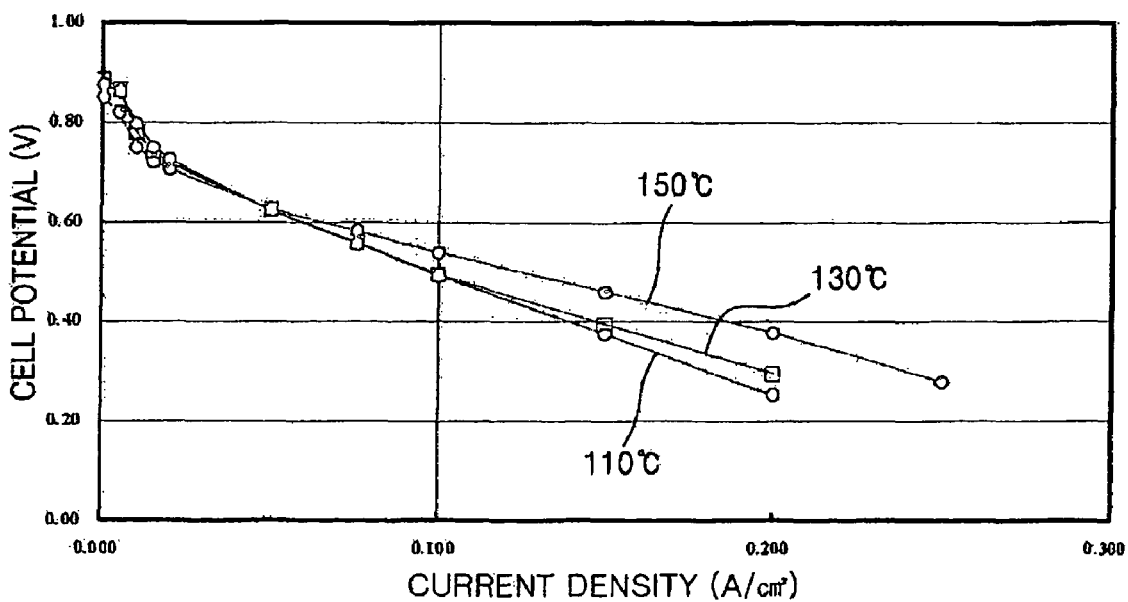
FIG. 2 is a graph of a cell potential with respect to a current density of a fuel cell according to Example 1 at an initial stage.

FIG. 2 is a graph of cell potential with respect to current density when a fuel cell was initially operated. Referring to FIG. 2, the fuel cell prepared according to Example 4 operated at high temperature, and more particularly, had better cell potential than a fuel cell prepared using NAFION (not shown) and the same cell potential as a fuel cell prepared using a polybenzimidazole (PBI) (not shown).

EXAMPLE 7

Polyurethane and Polyethylene (Metha) Acrylic Acid (PEAA) in a Weight Ratio of 3.3:6.5

0.36 g of 30 wt % PEAA aqueous solution was mixed with 1.5 g of Pt/C (45.8 wt % of Pt), 0.18 g of a mixed aqueous solution of 30 wt % water born polyurethane and a cross linking agent in which 27 wt % of water borne polyurethane, 3 wt % of trimethylolpropane tri-(2-methyl-1-aziridine propionate) as the cross linking agent, and 4.0 g of N-methyl-2-pyrrolidone (NMP). As a result, a catalyst layer forming composition was prepared.

The catalyst forming composition was bar coated on a carbon paper, and then heat treated 80° C. for one hour, 120° C. for 30 minutes, 150° C. for 15 minutes, and then 90° C. for about two hours, thereby producing an electrode. At this time, the amount of Pt loaded was about 1.17 mg/$cm^2$.

EXAMPLE 8

Polyurethane and Polyethylene Acrylic Acid (PEAA) in a Weight Ratio of 2.9:3.7

An electrode was manufactured in the same manner as in Example 7, except that the mixed weight ratio of polyurethane containing 3 wt % of the cross linking agent to PEAA was 2.9:3.7, and the amount of Pt loaded was about 1.38 mg/$cm^2$.

EXAMPLE 9

Polyurethane and Polyethylene Acrylic Acid (PEM) in a Weight Ratio of 2.7:3.6

An electrode was manufactured in the same manner as in Example 7, except that the mixed weight ratio of polyurethane containing 3 wt % of the cross linking agent to PEAA was 2.7:3.6, and the amount of Pt loaded was about 1.88 mg/$cm^2$.

COMPARATIVE EXAMPLE 1

4 g of Pt/C (45.8 wt % of Pt), 2 g of a polybenzimidazole solution prepared by dissolving 10 wt % polybenzimidazole (PBI) in N-methyl-2-pyrrolidone (NMP), 2 g of a polyvinylidenefluoride solution prepared by dissolving 5 wt % polyvinylfluoride in N-methyl-2-pyrrolidone, and 3.5 g of N-methyl-2-pyrrolidone were mixed to prepare a catalyst layer forming composition.

The catalyst forming composition was bar coated on a carbon paper, and then heat treated 80° C. for one hour, 120°

C. for 30 minutes, and at 150° C. for 15 minutes, thereby producing an electrode. At this time, the amount of Pt loaded was about 1.24 mg/cm².

EXAMPLE 10

The electrode manufactured according to Example 7 was used as a cathode, the electrode manufactured according to Comparative Example 1 was used as an anode, and a 63 μm-thick PBI electrolyte membrane was used as an electrolyte membrane. The electrolyte membrane was interposed between the cathode and the anode to produce a membrane electrode assembly. The membrane electrode assembly was operated at 110-150° C. under a non-humidified condition at 0.2 A/cm² for 20-24 hours while being provided with 100 ccm/min of hydrogen and 200 ccm/min of air. The active region of each electrode was about 7.84 cm².

EXAMPLES 11 AND 12

Membrane electrode assemblies were manufactured in the same manner as in Example 10, except that the electrodes manufactured according to Examples 8 and 9 were respectively used in Examples 11 and 12, instead of the electrode manufactured according to Example 7, and these membrane electrode assemblies were operated.

COMPARATIVE EXAMPLE 2

A membrane electrode assembly was manufactured in the same manner as in Example 10, except that the electrode manufactured according to Comparative Example 1 was used instead of the electrode manufactured according to Example 7 as the cathode, and this membrane electrode assembly was operated.

Tafel Slopes of the fuel cells prepared according to Examples 10 through 12 and Comparative Example 2 were measured. The results are shown in Table 1.

TABLE 1

| | Tafel Slope (V/decade) |
|---|---|
| Example 10 | 0.104 |
| Example 11 | 0.087 |
| Example 12 | 0.091 |
| Comparative Example 2 | 0.120 |

Referring to Table 1, the Tafel slope of the fuel cell manufactured according to Comparative Example 2 was 0.12 V/decade so that it was found that a large voltage loss occurred at low current. On the other hand, respective Tafel slopes of the fuel cells manufactured according to Examples 10 through 12 were smaller than that of the fuel cell manufactured according to Comparative Example 2 so that it was found that a potential loss was reduced at low current.

Figure 3:
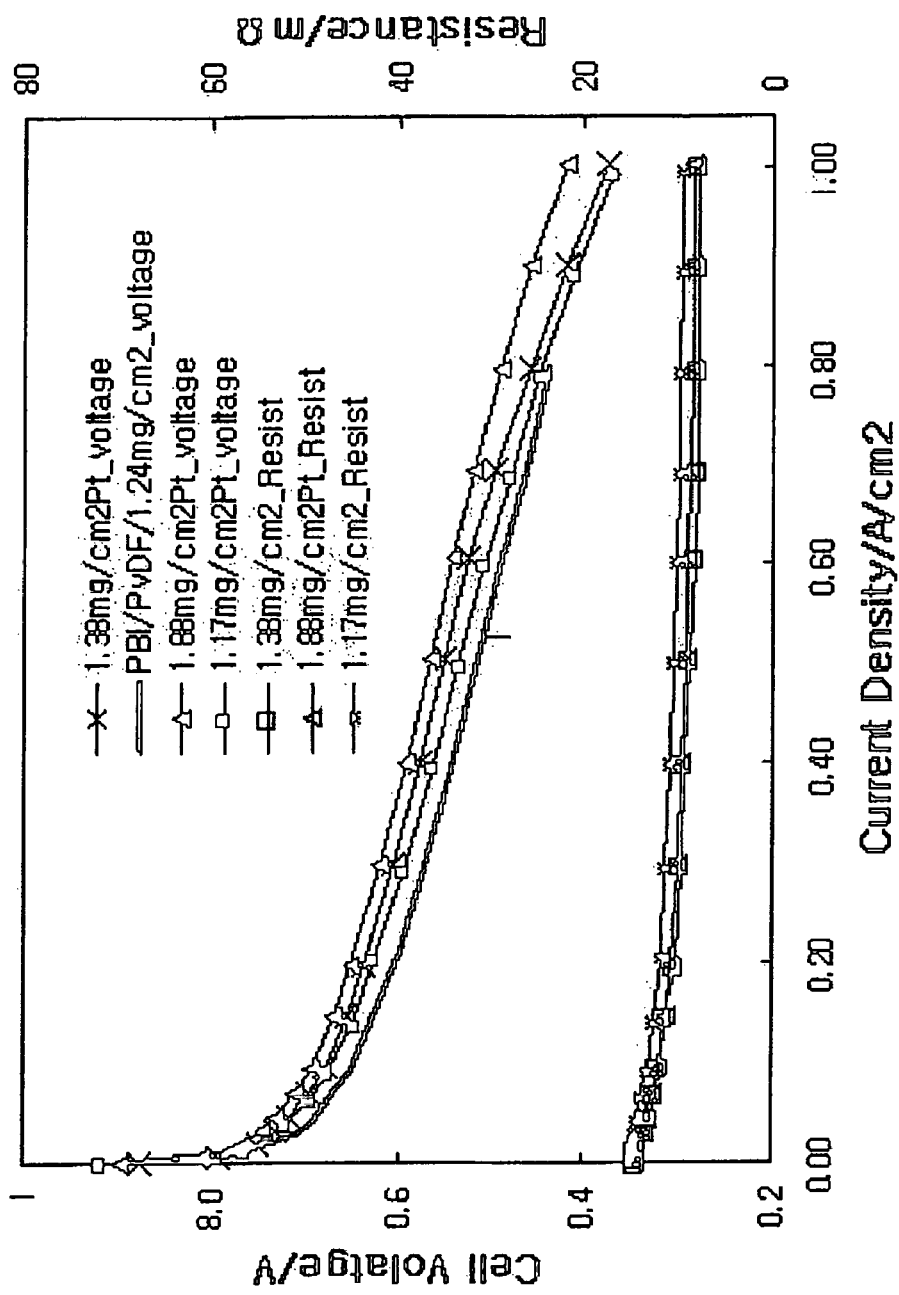
FIG. 3 is a graph of cell voltage with respect to current density of the fuel cells manufactured according to Examples 10 through 12 and Comparative Example 2.

Current density vs. voltage properties of the fuel cells manufactured according to Examples 10 through 12 and Comparative Example 2 were measured. The results are shown in FIG. 3. Referring to FIG. 3, the solid squares-line, the Xs-line, the solid-triangles line, and the heavy bold line denote the measured results of the fuel cells manufactured according to Examples 10 through 12 and Comparative Example 2, respectively.

Referring to FIG. 3, when the current density was 0.2 A/cm², voltages of the fuel cells manufactured according to Examples 10 and 11 were 0.62 V and 0.65 V, respectively. On the other hand, at the same current density, the voltage of the fuel cell manufactured according to Comparative Example 2 was about 0.60 V. As described above, the voltage of the fuel cell manufactured according to Example 10 in which the Pt loading was 1.17 mg/cm², which was less than 1.24 mg/cm² of the Pt loading in Comparative Example 2, was increased by 0.02 V compared to the voltage of the fuel cell manufactured according to Comparative Example 2. In addition, the voltage of the fuel cell manufactured according to Example 11 in which the Pt loading was 1.38 mg/cm² was increased to 0.65 V at the current density of 0.2 A/cm².

A proton conductive electrolyte according to aspects of the present invention can be prepared at lower costs than when conventional polybenzimidazole and NAFION are used, and can be easily formed into a membrane by casting from a solution. In addition, the thickness of the membrane can be easily adjusted. A proton conductive electrolyte membrane formed of the proton conductive electrolyte has excellent mechanical strength, flexibility, and high ionic conductivity.

An electrode according to aspects of the present invention maintains stability under high temperature operation conditions, and a support and a catalyst layer of the electrode can be bound to each other with an enhanced binding force. In addition, the electrode has excellent ion conductivity.

A fuel cell prepared using the proton conductive electrolyte and the electrode described above can operate at 100° C. or higher under non-humidified conditions exhibiting improved performance.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A proton conductive electrolyte, comprising a polymerization product obtained by polymerizing a mixture of a polyurethane based compound represented by formula 1 and a polyethylene(metha)acrylic acid represented by formula 2:

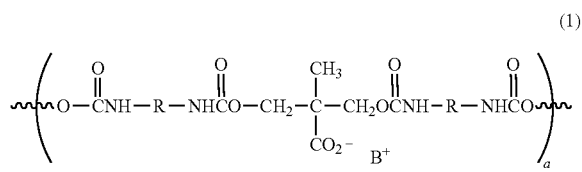

where R is a substituted or unsubstituted C1-C20 alkylene group, a substituted or unsubstituted C4-C20 cycloalkylene group, a substituted or unsubstituted C6-C20 arylene group, or substituted or unsubstituted C2-C20 heteroarylene group, a is a number between 10 and 500, and $B^+$ is $H^+$, $NH_4^+$, or an alkali metal ion; and

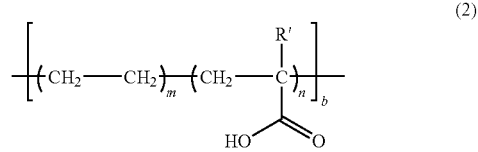

where R' is hydrogen or a methyl group, m ranges from 70 to 90 mol %, n ranges from 10 to 30 mol %, and b is a number between 50 and 1000.

2. The proton conductive electrolyte of claim 1, wherein the mixture of the polyurethane based compound represented by formula 1 and the polyethylene(metha)acrylic acid represented by formula 2 further comprises a cross linking agent.

3. The proton conductive electrolyte of claim 2, wherein the amount of the cross linking agent is in a range of 5-30 parts by weight based on 100 parts by weight of the polyurethane based compound represented by formula 1.

4. The proton conductive electrolyte of claim 2, wherein the cross linking agent is an aziridine based compound, an oxazoline based compound, or a mixture thereof.

5. The proton conductive electrolyte of claim 4, wherein the aziridine based compound is one of a modified diisocyanate and a diepoxide compound.

6. The proton conductive electrolyte of claim 1, wherein the amount of the polyethylene(metha)acrylic acid represented by formula 2 is in a range of 30 to 65 parts by weight based on 100 parts by weight of the polyurethane based compound represented by formula 1.

7. The proton conductive electrolyte of claim 1, further comprising an acid.

8. The proton conductive electrolyte of claim 7, wherein the acid is a phosphoric acid, and the amount of the phosphoric acid is in the range of 150-500 parts by weight based on 100 parts by weight of the polyurethane based compound represented by formula 1.

9. A method of preparing the proton conductive electrolyte of claim 1, the method comprising:
   adding a base to the polyethylene(metha)acrylic acid (PEAA) represented by formula 2 to obtain a corresponding salt;
   adding the polyurethane based compound represented by formula 1 and a solvent to the corresponding salt to prepare a mixture; and
   polymerizing the mixture:

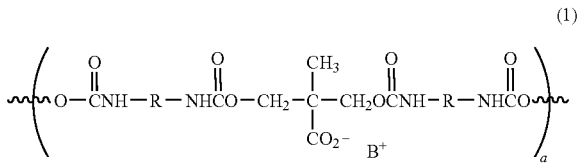

(1)

where R is a substituted or unsubstituted C1-C20 alkylene group, a substituted or unsubstituted C4-C20 cycloalkylene group, a substituted or unsubstituted C6-C20 arylene group, or substituted or unsubstituted C2-C20 heteroarylene group,
   a is a number between 10 and 500, and
   $B^+$ is $H^+$, $NH_4^+$, or an alkali metal ion; and

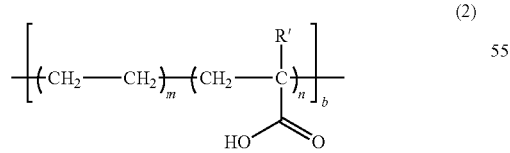

(2)

where R' is hydrogen or a methyl group, m ranges from 70 to 90 mol %, n ranges from 10 to 30 mol %, and b is a number between 50 and 1000.

10. The method of claim 9, wherein the mixture of the polyurethane based compound of formula 1 and the polyethylene (metha)acrylic acid of formula 2 further comprises a cross linking agent.

11. The method of claim 10, wherein the cross linking agent is an aziridine based compound, an oxazoline based compound, or a mixture thereof.

12. The method of claim 11, wherein the aziridine based compound is one of a modified diisocyanate and a diepoxide compound.

13. The method of claim 10, wherein the amount of the cross linking agent is in the range of 5 to 30 parts by weight based on 100 parts by weight of the polyurethane based compound represented by formula 1.

14. The method of claim 9, further comprising impregnating the polymerization product with an acid.

15. The method of claim 14, wherein the acid is a phosphoric acid, and the amount of the phosphoric acid is in the range of 150-500 parts by weight based on 100 parts by weight of the polyurethane based compound represented by formula 1.

16. The method of claim 9, wherein the polymerization is performed at 80 to 120° C.

17. The method of claim 9, wherein the polymerization is performed under irradiation from an electron beam, a gamma beam, a neutron beam, a microwave, a laser beam, an infrared beam, an ultraviolet beam, or a combination thereof.

18. The method of claim 9, wherein the base comprises at least one compound selected from the group consisting of ammonia water, triethylamine (TEA), tributylamine, sodium hydroxide (NaOH), potassium hydroxide (KOH), and lithium hydroxide (LiOH).

19. The method of claim 9, wherein the polymerizing is performed by casting the mixture and drying the cast result at 80 to 120° C.

20. An electrode for a fuel cell, comprising:
   a support; and
   a catalyst layer formed on the support, the catalyst layer comprising:
      a supported catalyst; and
      a polymerization product obtained by polymerizing a mixture of a polyurethane based compound represented by formula 1 and a polyethylene(metha)acrylic acid represented by formula 2:

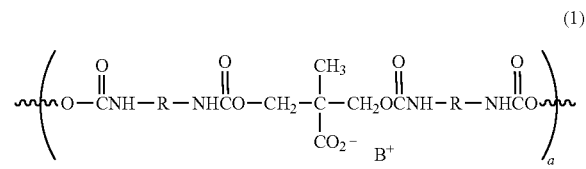

(1)

where R is a substituted or unsubstituted C1-C20 alkylene group, a substituted or unsubstituted C4-C20 cycloalkylene group, a substituted or unsubstituted C6-C20 arylene group, or substituted or unsubstituted C2-C20 heteroarylene group,
   a is a number between 10 and 500, and
   $B^+$ is $H^+$, $NH_4^+$, or an alkali metal ion; and

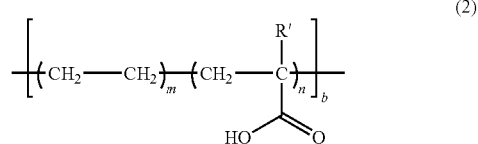

(2)

where R' is hydrogen or a methyl group, m ranges from 70 to 90 mol %, n ranges from 10 to 30 mol %, and b is a number between 50 and 1000.

21. The electrode of claim 20, wherein the mixture of the polyurethane based compound represented by formula 1 and the polyethylene(metha)acrylic acid represented by formula 2 further comprises a cross linking agent.

22. The electrode of claim 21, wherein the cross linking agent is an aziridine based compound, an oxazoline based compound, or a mixture thereof.

23. The electrode of claim 22, wherein the aziridine based compound is one of a modified diisocyanate and a diepoxide compound.

24. The electrode of claim 21, wherein the amount of the cross linking agent is in the range of 5-30 parts by weight based on 100 parts by weight of the polyurethane based compound represented by formula 1.

25. The electrode of claim 20, wherein the amount of the polymerization product is in the range of 3-25 parts by weight based on 100 parts by weight of the supported catalyst.

26. The electrode of claim 20, further comprising an acid.

27. The electrode of claim 26, wherein the acid is a phosphoric acid, and the amount of the phosphoric acid is in the range of 10-200 parts by weight based on 100 parts by weight of the supported catalyst.

28. A method of manufacturing an electrode for a fuel cell, the method comprising:
adding a base to a polyethylene(metha)acrylic acid (PEAA) represented by formula 2 to obtain a corresponding salt;
adding a polyurethane based compound represented by formula 1 and a solvent to the corresponding salt to prepare a mixture; and
polymerizing the mixture to form the electrode of claim 1:

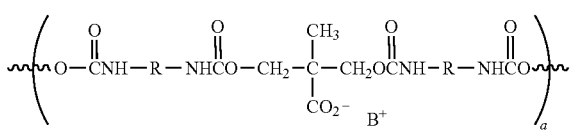

where R is a substituted or unsubstituted C1-C20 alkylene group, a substituted or unsubstituted C4-C20 cycloalkylene group, a substituted or unsubstituted C6-C20 arylene group, or substituted or unsubstituted C2-C20 heteroarylene group,
a is a number between 10 and 500, and
$B^+$ is $H^+$, $NH_4^+$, or an alkali metal ion; and

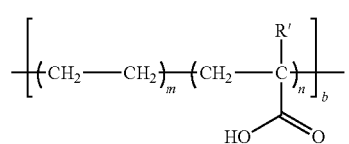

where R' is hydrogen or a methyl group, m ranges from 70 to 90 mol %, n ranges from 10 to 30 mol %, and b is a number between 50 and 1000.

29. The method of claim 28, wherein the mixture of the polyurethane based compound represented by formula 1 and the polyethylene(metha)acrylic acid represented by formula 2 further comprises a cross linking agent.

30. The method of claim 29, wherein the cross linking agent is an aziridine based compound, an oxazoline based compound, or a mixture thereof.

31. The method of claim 30, wherein the aziridine based compound is one of a modified diisocyanate and a diepoxide compound.

32. The method of claim 29, wherein the amount of the cross linking agent is in the range of 5-30 parts by weight based on 100 parts by weight of the polyurethane based compound represented by formula 1.

33. The method of claim 28, further comprising impregnating the polymerization product with an acid.

34. The method of claim 33, wherein the acid is a phosphoric acid, and the amount of the phosphoric acid is in the range of 150-500 parts by weight based on 100 parts by weight of the polyurethane based compound represented by formula 1.

35. The method of claim 28, wherein the polymerization is performed at 80 to 120° C.

36. The method of claim 28, wherein the polymerization is performed under irradiation from an electron beam, a gamma beam, a neutron beam, a microwave, a laser beam, an infrared beam, an ultraviolet beam, or a combination thereof.

37. The method of claim 28, wherein the base comprises at least one compound selected from the group consisting of ammonia water, triethylamine (TEA), tributylamine, sodium hydroxide (NaOH), potassium hydroxide (KOH), and lithium hydroxide (LiOH).

38. The method of claim 28, wherein the polymerizing of the mixture is performed by casting the mixture and drying the cast result at 80 to 120° C.

39. A fuel cell comprising the proton conductive electrolyte of claim 1.

40. A fuel cell comprising the proton conductive electrolyte of claim 2.

41. A fuel cell comprising the electrode of claim 20.

42. A fuel cell comprising the electrode of claim 21.

43. A method of preparing a proton conductive electrolyte, the method comprising:
adding a base to a polyethylene(metha)acrylic acid (PEAA) represented by formula 2 to obtain a corresponding salt;
adding a polyurethane based compound represented by formula 1 and a solvent to the corresponding salt to prepare a mixture; and
polymerizing the mixture:

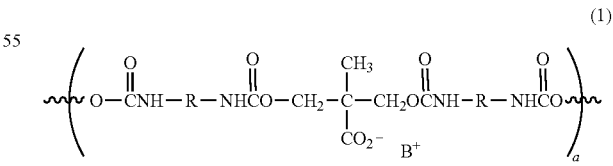

where R is a substituted or unsubstituted C1-C20 alkylene group, a substituted or unsubstituted C4-C20 cycloalkylene group, a substituted or unsubstituted C6-C20 arylene group, or substituted or unsubstituted C2-C20 heteroarylene group,
a is a number between 10 and 500, and
$B^+$ is $H^+$, $NH_4^+$, or an alkali metal ion; and

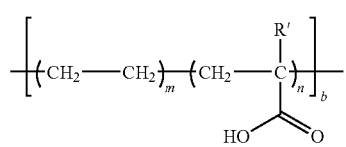
(2)

where R' is hydrogen or a methyl group, m ranges from 70 to 90 mol %, n ranges from 10 to 30 mol %, and b is a number between 50 and 1000.

44. A method of manufacturing an electrode for a fuel cell, the method comprising:
adding a base to a polyethylene(metha)acrylic acid (PEAA) represented by formula 2 to obtain a corresponding salt;
adding a polyurethane based compound represented by formula 1 and a solvent to the corresponding salt to prepare a mixture; and
polymerizing the mixture to form an electrode:

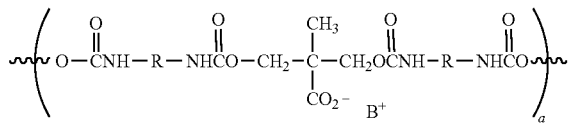
(1)

where R is a substituted or unsubstituted C1-C20 alkylene group, a substituted or unsubstituted C4-C20 cycloalkylene group, a substituted or unsubstituted C6-C20 arylene group, or substituted or unsubstituted C2-C20 heteroarylene group,
a is a number between 10 and 500, and
$B^+$ is $H^+$, $NH_4^+$, or an alkali metal ion; and

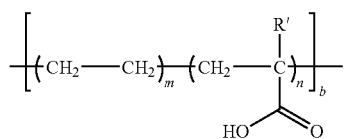
(2)

where R' is hydrogen or a methyl group, m ranges from 70 to 90 mol %, n ranges from 10 to 30 mol %, and b is a number between 50 and 1000.

* * * * *